`US010387718B2`

(12) United States Patent
Guerrini et al.

(10) Patent No.: US 10,387,718 B2
(45) Date of Patent: Aug. 20, 2019

(54) METHOD FOR DETECTING TARGETS ON THE GROUND AND IN MOTION, IN A VIDEO STREAM ACQUIRED WITH AN AIRBORNE CAMERA

(71) Applicant: Thales, Courbevoie (FR)

(72) Inventors: Gilles Guerrini, Pessac (FR); Fabien Camus, Pessac (FR); Fabien Richard, Pessac (FR)

(73) Assignee: THALES, Courbevoie (FR)

( * ) Notice: Subject to any disclaimer, the term of this patent is extended or adjusted under 35 U.S.C. 154(b) by 360 days.

(21) Appl. No.: 15/405,332

(22) Filed: Jan. 13, 2017

(65) Prior Publication Data
US 2017/0213078 A1 Jul. 27, 2017

(30) Foreign Application Priority Data

Jan. 26, 2016 (FR) ...................................... 16 00125

(51) Int. Cl.
*G06K 9/00* (2006.01)
*G06K 9/46* (2006.01)
(Continued)

(52) U.S. Cl.
CPC ..... *G06K 9/00335* (2013.01); *G06K 9/00758* (2013.01); *G06K 9/4604* (2013.01);
(Continued)

(58) Field of Classification Search
CPC .................. G06F 3/005; G06F 3/0418; G06T 2207/10032; G06T 2207/10012;
(Continued)

(56) References Cited

U.S. PATENT DOCUMENTS 5,629,988 A 5/1997 Burt et al.
8,922,498 B2 * 12/2014 Vesely .................. G06F 3/0418
345/173
(Continued)

FOREIGN PATENT DOCUMENTS

| CN | 104 408 725 A | 3/2015 |
| JP | 2013 142636 A | 7/2013 |
| WO | 200967819 A1 | 6/2009 |

OTHER PUBLICATIONS

Dale, J., Scott, D., Dwyer D., Thornton J., "Target Tracking, Moving Target Detection, Stabilisation and Enhancement of Airborne Video", Airborne Intelligence, Surveillance, Reconnaisance (ISR) Systems and Applications II, Proceedings of SPIE, Jun. 3, 2005, pp. 154-165, vol. 5787, SPIE, Bellingham, WA, USA.
(Continued)

*Primary Examiner* — Shaghayegh Azima
(74) *Attorney, Agent, or Firm* — Soquel Group LLC

(57) ABSTRACT

A target detection method for detecting targets on the ground and in motion, in a video stream that is acquired by an airborne digital camera, which includes the steps of: processing a plurality of successive frames in the video frame in a manner so as to stabilize the frames as if they had been acquired by a fixed camera; and comparing two processed frames, temporally separated from the other, so as to identify the zones of pixels in motion from one processed frame to the other, one zone of pixels in motion constituting a detected target.

10 Claims, 2 Drawing Sheets

(51) Int. Cl.
  *G06K 9/52* (2006.01)
  *G06T 5/00* (2006.01)
  *G06T 7/254* (2017.01)
(52) U.S. Cl.
  CPC ............ *G06K 9/4652* (2013.01); *G06K 9/52* (2013.01); *G06T 5/006* (2013.01); *G06T 7/254* (2017.01); *G06T 2207/10032* (2013.01); *G06T 2207/30212* (2013.01); *G06T 2207/30252* (2013.01)
(58) Field of Classification Search
  CPC ........... G06T 2207/30252; G06T 5/006; G06T 7/254; G06K 9/4604; G06K 9/00335; G06K 9/00758; G06K 9/4652; G06K 9/52
  See application file for complete search history.

(56) References Cited

U.S. PATENT DOCUMENTS

| | | | | |
|---|---|---|---|---|
| 9,811,946 | B1* | 11/2017 | Hung | H04N 5/23238 |
| 2007/0035630 | A1* | 2/2007 | Lindenstruth | H04N 5/23248 348/208.99 |
| 2007/0268364 | A1* | 11/2007 | Neff | G06T 7/215 348/143 |
| 2008/0042812 | A1* | 2/2008 | Dunsmoir | G06K 9/00805 340/435 |
| 2010/0208801 | A1* | 8/2010 | Yamasaki | H04N 19/172 375/240.12 |
| 2013/0038745 | A1* | 2/2013 | Myokan | H04N 5/144 348/208.99 |
| 2014/0118716 | A1* | 5/2014 | Kaganovich | G01S 17/89 356/4.01 |
| 2014/0218195 | A1* | 8/2014 | Buckley | G08B 13/19606 340/541 |
| 2015/0353206 | A1* | 12/2015 | Wang | B64F 1/00 244/114 R |
| 2016/0321820 | A1* | 11/2016 | Ely | G06T 7/254 |
| 2017/0180645 | A1* | 6/2017 | Weckel | H04N 5/23251 |

OTHER PUBLICATIONS

French Patent Application No. FR 16 00125, Rapport de Recherche Préliminaire, Dec. 1, 2016, 4 pages.

* cited by examiner

METHOD FOR DETECTING TARGETS ON THE GROUND AND IN MOTION, IN A VIDEO STREAM ACQUIRED WITH AN AIRBORNE CAMERA

CROSS REFERENCE TO RELATED APPLICATIONS

This application claims priority under 35 USC § 119 of French Patent Application No. 16 00125 filed on Jan. 26, 2016.

FIELD OF THE INVENTION

The field of the present invention relates to target detection methods for detecting targets on the ground and in motion, in a video stream that is acquired by an airborne camera.

BACKGROUND OF THE INVENTION

An airborne camera is a mobile camera that is movable in relation to the ground, not only because the aircraft bearing the camera moves in relation to the ground, but also because an operator controls, for example from a station on the ground, the movements of the camera relative to the aircraft, in a manner so as to be able to observe a particular zone being flown over by the latter. The acquired video stream is transmitted, in real-time, to the ground-based station for analysis.

The detection of motion on the ground of vehicles of all types (military vehicle, car, two-wheelers, etc.) is an essential information element to be extracted from the video stream.

The automatic detection of vehicles on the ground and in motion in a video stream that is acquired by a fixed camera, for example mounted rigidly on a mast locally installed in the environment, is already known. The fact that the camera is fixed relative to the ground makes it possible to ignore the backdrop of the scene being observed and to process only the portions of the image that change from one frame of the video stream to the next, and which therefore represent the potential targets.

For a video stream that is acquired by a mobile camera, detection of the portions of the image that change from one frame to the other may be done automatically by effectively implementing a Harris procedure. Such a procedure consists, at the initial stage, of applying an identification algorithm for identifying the noticeable points on an image of the video stream, then, at a subsequent stage, of applying a reconstruction algorithm for associating the noticeable points identified in the image considered, in a manner so as to delimit the portions of the image that correspond to an object being observed. The evolving change in these portions from one image to another makes it possible to determine whether an object is in motion.

However, such an algorithm is not sufficient for distinguishing targets of small sizes, in this case vehicles that are being observed remotely by means of an airborne camera.

But above all, such an algorithm requires a very high amount of computing time, in particular for the association of noticeable points in a manner so as to define the objects. Such a substantial time period for computation is not compatible with carrying out an analysis of the acquired video stream in real-time.

Thus, currently, the video stream that is acquired by an airborne camera is displayed on a screen of the ground-based station and the operator visually analyses the series of successive images in order to try to identify objects in motion. The operator may be forced to remain engaged in the task for the several hours needed to effectively carry out this visual analysis. Given that it would be impossible for the operator to maintain constant and undivided attention, the detection of targets in this way is not always effective.

SUMMARY OF THE DESCRIPTION

The objective of the invention is to overcome this problem, in particular by offering a method that provides assistance to the operator by detecting automatically and in real time, in the video stream that is acquired by a camera installed on-board, the targets constituted by the objects that are moving relative to the backdrop and presenting these potential targets in an appropriate manner to the operator.

The object of the invention relates to a target detection method for detecting targets on the ground and in motion, in a video stream that is acquired by an airborne digital camera, characterized in that it includes the steps consisting of: processing a plurality of successive frames in a manner so as to stabilize the frames like as if they had been acquired by a fixed camera and comparing two processed frames, each one temporally separated from the other, in a manner so as to identify the zones of pixels in motion from one frame to the other, the zones of pixels in motion constituting the targets detected.

The method according to the invention makes possible the detection of targets on the ground and in motion (in particular targets of small sizes in terms of number of pixels in an acquired image) in a raw video stream originating from a camera borne by an aircraft, the video stream is dynamic in the sense that the orientation and/or the magnification of the camera in relation to the backdrop change(s) during the course of filming.

The method is based on the ability to distinguish the difference between a point on the ground and a point of an object in motion relative to the ground, based on the determination of their relative movement, which evolves in a distinctive manner both in direction and in intensity.

In accordance with particular embodiments, the method includes one or more of the following characteristic features, taken into consideration individually or in accordance with all technically possible combinations:

the step consisting of processing a plurality of successive frames includes an error correction step of correcting a relative parallax error affecting each frame of the said plurality of successive frames in a manner so as to obtain, for each frame, a corrected frame, with this step effectively implementing a mapping determination algorithm for determining a projective mapping that makes it possible to pass from the given frame at a current time instant to a corrected frame associated with a frame at a preceding sampling time instant.

the step consisting of processing a plurality of successive frames includes a motion vector determination step for determining a vector of the movement of the camera in relation to the ground, with this step effectively implementing an optical flow determination algorithm for determining an optical flow that makes it possible to pass from a current corrected frame to a past corrected frame that is separated from the current corrected frame by a whole number or integer s of sampling time instants.

the determination algorithm for determining an optical flow uses a homogenous grid of points.

- the whole number s is selected to be between 5 and 15, preferably equal to 10.
- once the motion vector of the movement of the camera in relation to the ground has been determined, a corresponding mapping is applied to the current corrected frame in order to compensate for the effect of the movement of the camera and obtain a final frame that may possibly be superimposed on the past corrected frame by way of the initial frame.
- the step consisting of comparing the two frames consists of comparing the initial and final frames to each other by carrying out successively the following sub-steps that consist of: removing pixel by pixel the initial frame from the final frame in a manner so as to obtain for each pixel, a color distance value applying a color distance threshold value, with each pixel having a color distance value that is less than or equal to the said threshold value, taking the null value, and each pixel having a color distance value that is greater than the said threshold taking the unit value, in a manner so as to obtain a binary map and applying a contour determination algorithm on the binary map in order to group together the pixels having unit value into zones of pixels in motion.
- the resulting binary map obtained at the end of the application sub-step of applying a threshold value being an intermediate binary map, the following sub-steps are thus carried out: application of a morphological erosion transform using an appropriate mask application of a morphological dilation transform using the mask for the morphological erosion transform.
- the method includes a supplementary verification step for verifying the consistency of the zones of pixels in motion identified at the end of the comparison step for comparing two frames, consisting of determining, for each zone in motion, an index of correlation between the values of pixels in the two frames, a zone in motion being deemed to correspond to a target when the correlation index is close to the value −1.
- a zone of pixels in motion identified at the end of the comparison step is displayed in an appropriate manner superimposed over the video stream displayed on a control monitor.
- the video stream is a video stream in the visible spectral domain or Infra-red domain.
- the method is executed in real time or at constrained time on the video stream.
- the method makes possible the detection of targets of small sizes, of the order of a few pixels.

The object of the invention is also related to a data recording medium for recording information that contains the instructions of a computer program that are suitable for being executed by a computer in order to operationally implement a target detection method for detecting targets on the ground and in motion, in a video stream that is acquired by an airborne digital camera in accordance with the preceding method.

BRIEF DESCRIPTION OF THE DRAWINGS

The invention and its advantages will be better understood upon reading the detailed description which follows the disclosure of a particular embodiment, provided only by way of non-limiting example, the description being made with reference to the attached drawings in which.

DETAILED DESCRIPTION

Figure 1:
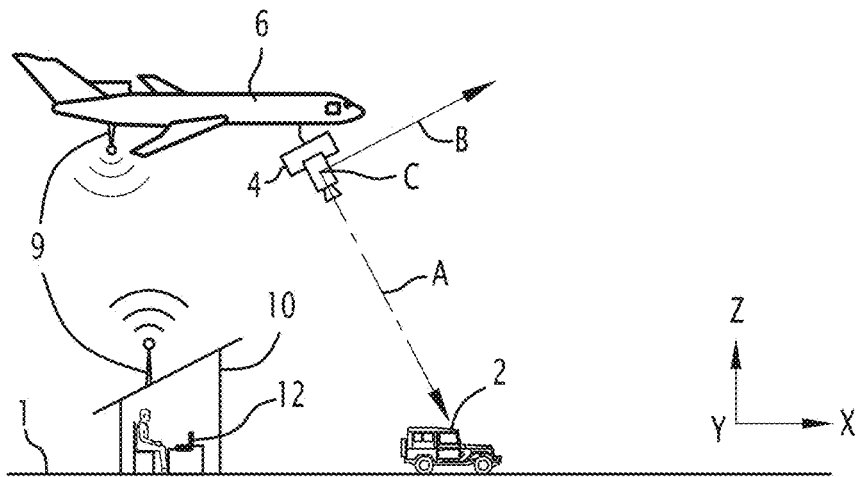
FIG. 1 is a diagram of the system in which the method according to the invention is being operationally implemented.

As schematically represented in FIG. 1, the method according to the invention makes possible the detection of a target 2, of the type constituted by a vehicle in motion on the surface of the ground 1, in a video stream that is acquired by a camera 4 borne by an aircraft 6.

The camera 4 allows the acquisition of images in the optical or infrared domain.

The camera 4 is a digital camera, of such type that each image acquired is a matrix of N×M pixels, referred to as a frame in the sections that follow.

The acquired video stream contains for example 24 frames per seconds, but other frequencies of acquisition may be envisaged.

During the course of the acquisition, the aircraft 6 is movable in relation to the ground with six degrees of freedom.

During the course of the acquisition, the camera 4 is movable relative to the aircraft 6. For example, the camera being fixed under the aircraft 6, it may be moved along two angular degrees of freedom. The camera 6 also has one degree of freedom in magnification, which provides the ability to zoom in on a zone of interest, on the ground.

Thus, during the course of filming, the camera defined by its optical center C, its optical axis A, and an axis that is orthogonal to the optical axis B (that provides the ability to orient the image plane of the camera) moves in relation to the ground 1 along three Cartesian coordinates X, Y and Z and three angular coordinates. To these movements in space, it is necessary to add the possibility of a variation in magnification w.

The video stream is transmitted to a ground-based station 10 by making use of suitable telemetry means 9.

The station 10 includes at least one computer 12 comprising the computation means, such as a processor, and data storage means, such as read/write random access memory (RAM) and read-only memory (ROM), with the data storage means storing the computer program instructions that are suitable for being executed by the computation means. In particular, the data storage means store a program that provides the ability, during its execution by the computation means, to operationally implement the method 100 according to the invention on a video stream. Preferably, the program is executed in real time on the raw video stream received.

Figure 2:
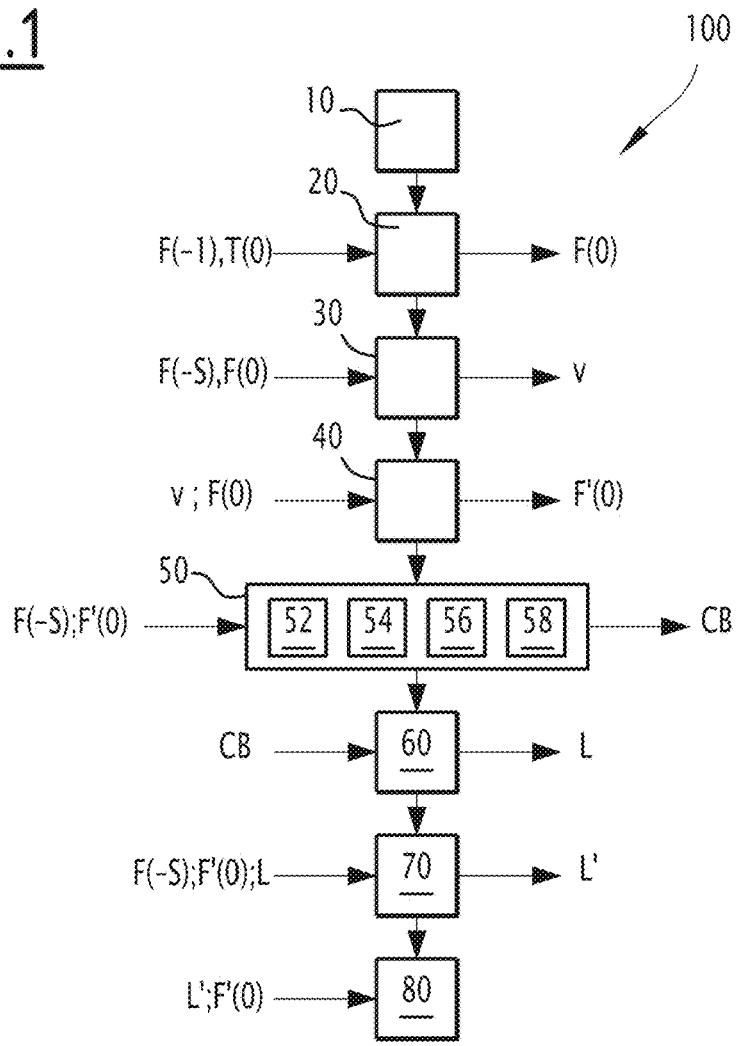
FIG. 2 is a block diagram of the method according to the invention.

The target detection method 100 for detecting targets on the ground and in motion in a video stream that is acquired by an airborne camera will now be described with reference to FIG. 2.

STEP 10 for the Acquisition of a Video Stream

During the course of the flight of the aircraft 6, the camera 4 executes the acquisition of a plurality of successive frames. The corresponding video stream is transmitted to the ground-based station 10.

The video stream received by the ground-based station 10 is broken down into frames T. Each frame is labeled temporally and stored in the data storage means of the 12 computer.

If T(0) is the frame at the current time instant $t_0$, T(−1) is the preceding frame, separated by a time step that is equal to the inverse of the frequency of acquisition, f, and T(−s) is the past frame at the time instant $t_{-s}$ which is separated from the current time instant $t_0$ by a time period that is s times the time step 1/f, s being a natural integer.

In order to allow for the application of the method according to the invention in real time, about one frame out of two of the initial video stream is taken into account. Thus the frequency f of the frames used is for example 12 frames per second. It will be noted that the method according to the invention uses a plurality of successive frames, which are not necessarily consecutive frames of the video stream. In addition, the time period between two successive frames is not necessarily constant.

STEP 20 of Correction of the Parallax Error Affecting Each Frame

The goal of the first processing step is to transform a set of s successive frames in a manner so as to bring them into a common plane of reference, which is fixed in relation to the ground. Advantageously, this common plane of reference is formed by the plane of the coordinates of a frame taken as reference, for example the frame T(−s) at the time instant $t_{-s}$.

This mapping is intended to correct the relative parallax error introduced by the movement of the camera over the course of the time period s, between the different frames.

A priori (initially), the plane of reference does not correspond to the plane XY of the ground 1, that is to say, the acquisition plane of the image at time instant $t_{-s}$ is not parallel to the plane XY of the surface of the ground. Thus, after mapping, a common residual parallax error will affect all of the s frames considered. However, if rather than the identification of the speed of a target, the simple movement of this target were to be the focus of interest, this residual parallax error would have no effect.

It is worth noting that this step of correction also provides the ability to correct the effects of variation of the magnification w of the camera and of variation of the altitude Z of the camera between the different frames considered.

The corrected frame, resulting from the correction of the relative parallax error of the frame T(−i) as compared with the frame T(−s), is denoted as F(−i).

It thus then involves processing of the current frame T(0) in order to correct the relative parallax error.

The correction of the relative parallax error falls within the scope of the projective mappings, which include translations, Euclidean transformations (that is to say rotations in a plane), similarities (that is to say changes in scale), the affine transformations and projective transformations, as well as combinations of these mappings.

In order to determine the projective mapping to be applied to the current frame T(0) so as to obtain the corresponding corrected current frame F(0), the frame T(0) is compared with the preceding corrected frame F(−1), which happens to be already brought into the common plane of reference.

This comparison should provide the ability to determine the projective mapping M that makes it possible to move the coordinates from the current frame T(0) to those of the preceding corrected frame F(−1).

The matrix of the projective mapping M is defined by:

$$\begin{bmatrix} x' \\ y' \\ w' \end{bmatrix} = M * \begin{bmatrix} x \\ y \\ 1 \end{bmatrix} \Longleftrightarrow \begin{bmatrix} x' \\ y' \\ 1 \end{bmatrix} = \frac{1}{w'} * \begin{bmatrix} x' \\ y' \\ w' \end{bmatrix} \quad (2.7)$$

with x and y being the coordinates of a pixel, or point p, in the current frame T(0), x' and y' being the coordinates of the corresponding point p' in the preceding corrected frame F(−1), and w' a scaling factor that is used to compensate for the vertical movement of the carrier and/or the magnification of the camera.

In order to determine the matrix for the projective image mapping M, it is necessary to identify at least q points $p_i$ present in the current frame T(0) and that are found at points $p'_i$ in the preceding corrected frame F(−1).

In order to do this, it is necessary to apply an identification algorithm for identifying the noticeable points on each of the two frames considered, and a matching algorithm for matching noticeable points that are similar between these two frames. For example, the identification algorithm corresponds to the one effectively implemented in the HARRIS procedure, which is not very resource intensive in terms of computing time. Moreover the matching algorithm is also for example, a simple algorithm that is used for comparing the neighborhoods between one noticeable point $p_i$ and one of the noticeable points $p'_j$, and for selecting as point $p'_i$ corresponding to the point $p_i$ the point that satisfies to the extreme the criterion used.

Thereafter a motion vector $p_i p'_i$ is determined for each pair of similar points between the frames T(0) and F(−1).

In order to find the matrix of the projective image mapping M based on the pairs ($p_i$; $p'_i$) of similar points, it is necessary to solve the system of equations over q pairs of points, q being at least equal to four $$M * p_1 = p'_1 \quad (2.8)$$
$$M * p_2 = p'_2$$
$$\vdots$$
$$M * p_n = p'_n$$

which can be written in the following form $$MP = P' \Leftrightarrow (MP)^T = P'^T \Leftrightarrow P^T M^T = P'^T \quad (2.9)$$

with:

$$P = \begin{bmatrix} p_1 \\ p_2 \\ \vdots \\ p_n \end{bmatrix} \quad P' = \begin{bmatrix} p'_1 \\ p'_2 \\ \vdots \\ p'_n \end{bmatrix}$$

With the method of least squares, it is shown that the solution is given by:

$$M^T = (PP^T)^{-1} PP'^T \Leftrightarrow M = ((PP^T)^{-1} PP'^T)^T \quad (2.10)$$

The application of the matrix thus calculated to all of the pixels of the current frame T(0) makes it possible to obtain the corrected current frame F(0).

STEP 30 of Determination of the Movement of the Camera in Relation to the Backdrop The determination of the movement of the camera in relation to the ground 1 over the course of the time period s, is carried out by comparing the past corrected frame F(−s) and the current corrected frame F(0).

The value of the integer s is chosen to be sufficiently large so as to be able to observe a displacement of the points of the ground between the two frames compared.

On the other hand, the value of the integer s is chosen to be small enough not only to find a potential target on both the two frames compared, but especially in order for the algorithms to be able to converge relatively quickly.

The value of the integer s is taken to be between 5 and 15 and is preferably equal to 10.

During the aerial filming, the major part of the image is made up of points on the ground 1 and not of the points of the objects in motion.

A grid of points $p_i(-s)$ is placed on the past corrected frame F(−s). Consequently, the points of the grid are thus primarily points corresponding to the points of the ground.

The assessment of the movement of these points, or optical flow, from the past corrected frame F(−s) to the current corrected frame F(0) will provide the ability to estimate the motion vector v, in intensity and direction, of the camera in relation to the ground (that is to say with respect to the speed vector resulting from the combination of the relative movements of the camera 4 in relation to the aircraft 6 and of the aircraft 6 in relation to the ground 1, accurate to within the residual parallax error and to within the magnification).

The computation of the optical flow at each point $p_i(-s)$ of the grid is achieved by making use for example, of an algorithm referred to as Lucas and Kanade optical flow algorithm.

This algorithm assumes that the displacement of a point $p_i(-s)$ of the grid between the frames F(−s) and F(0) is small and that this displacement is approximately constant for any point p belonging to a neighborhood of the point $p_i(-s)$ considered.

A study of the characteristics of the pixels around the point $p_i(-s)$ and the search for these characteristics around points p that are not too distant from the point $p_i(-s)$ in the corrected current frame F(0) provides the means to determine the point $p_i(\mathbf{0})$ of the corrected current frame F(0) corresponding to the point $p_i(-s)$ of the corrected past frame F(−s). The optical flow at the point $p_i(-s)$ is then given by the motion vector connecting the points $p_i(-s)$ and $p_i(\mathbf{0})$.

Figure 3:
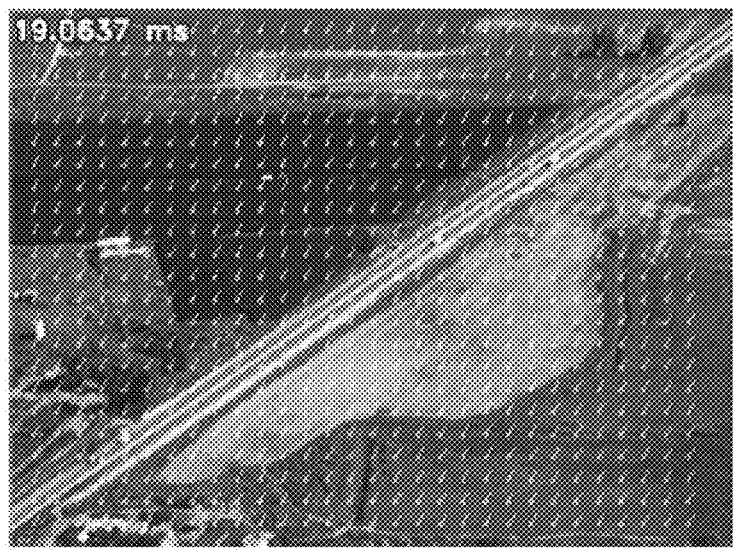
FIG. 3 is a current frame on which have been superimposed the motion vectors determined during the course of the method represented in FIG. 2.

In FIG. 3, a corrected past frame F(−s) is represented on which have been superimposed the motion vectors of the optical flow obtained by comparison with a corrected current frame F(0).

This method is a local method, which provides the ability to obtain motion vectors for each of the points of the grid.

The maximum of the distribution of the intensity of the motion vectors and the maximum of the distribution of the orientation of the motion vectors in the XY plane constitute an estimate respectively of the intensity and direction in the XY plane of the motion vectors v of the camera 4 in relation to the backdrop.

Preferably, the motion vectors v are determined based on the distribution of the motion vectors by effectively implementing a RANSAC (Random Sample Consensus) algorithm. Such an algorithm is used to estimate the motion vectors v in an iterative manner by progressively eliminating the motion vectors associated with the grid points which correspond to objects in motion or to measurement errors.

It should be noted that the space between the grid and the margin of the frame may be configured, in a manner so as to prevent the points of the grid from going out of the framework of the frame between time instants $t_{-s}$ and $t_0$ and thereby causing distortion of the computation. It therefore entails in effect "trimming" the border of the frame in order to be certain of finding the central image of the corrected past frame F(−s) in the corrected current frame F(0).

In addition, such a configuration setup provides the ability to control the number of points constituting the grid and, consequently thus, to be able to achieve a compromise between the computing time and the quality of the estimate: the smaller the number of points in the grid, the more rapidly this step will converge; the greater the number of points in the grid, the more precise will be the estimate of the motion vector v.

Since this step takes advantage of the fact that the image essentially includes points on the ground, a grid having points distributed in a homogenous manner may be used. Thus a gain in time is obtained in this way, since it is not necessary to compute a specific grid based for example on Harris regions that are used to isolate the portions of this image that correspond to the ground.

This algorithm is efficient because the points grid allows for an over-representation of the ground points and thus the identification of the maxima of the distribution of motion vectors as the movement of the camera in relation to the ground.

STEP 40 of Compensating for the Movement of the Camera

The motion vector v of the camera in relation to the backdrop provides the ability to construct a compensation matrix V, of such type as a translation matrix, in order to compensate for the movement of the camera between the initial time instant $t_{-s}$ of acquisition of the frame F(−s) and the final current time instant $t_0$ of acquisition of the frame F(0).

The compensation matrix V is then applied to the current corrected frame F(0), in a manner so as to obtain a final current frame F'(0), that may be directly superimposed on to that of the corrected past frame F(−s) or initial frame. In other words, the frame F'(0) is now in the reference repository of the frame F(−s) and all of this comes about as if the frames F'(0) and F(−s) had been acquired by a static camera.

Thereafter, it is necessary to detect the regions in motion by comparing these two observation frames from observing the same scene, from the same point of view, but at two different time instants.

STEP 50 of Identification of Targets

The step of identification of targets in motion is broken down into a series of sub-steps.

In a sub-step 52 of removal, an absolute difference is rendered and noted between the two initial F'(0) and final F(−s) frames in order to determine, for each pixel, a color distance value. This value represents the changes in state of the pixels between the two frames compared.

In practice, the noise of the sensor of the camera 4 alters these values, that is to say that two frames will be never the same even in the case of a static scene. It is therefore necessary to determine a threshold value m below which it is considered that color distance value corresponds to a simple background noise and above which it is considered that this value corresponds to movement related information. The threshold value m is configurable.

Thus, in the step 54 of thresholding, for each pixel, if the color distance value is less than this threshold value, the value of this pixel is brought back to the null value. On the other hand, if the value of the pixel is greater than this threshold value, the value of this pixel is set to the unit value. An intermediate binary map is obtained in this way.

Figure 4:
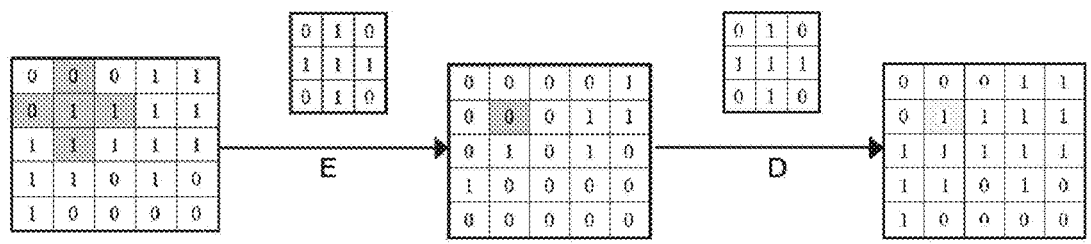
FIG. 4 represents the application of an erosion mask, and subsequently a dilatation mask in accordance with the method represented in FIG. 2.

In the sub-step 56 an erosion of factor n is applied in order to eliminate the unwanted artifacts that may have affected the acquisition of frames and which, in the intermediate binary map, are similar to a Dirac pulse. To eliminate them, a morphological erosion operator E is applied on the intermediate binary map, which corresponds to the application of a bit mask on each pixel of the binary map, as it is represented in FIG. 4. For each pixel of the bitmap that presents a positive value, if the four immediately neighboring pixels also have a positive value, then the value of the pixel considered remains at the unit value 1, otherwise it will be set to the null value 0.

The erosion thus makes it possible to eliminate the zones of the intermediate binary map that have a reduced size, on the order of one pixel, and to trim those having a larger size, of the order of a few pixels.

In the sub-step 58, so as to counter the second effect of the erosion, a morphological dilation operator D which is the inverse of the erosion operator E is applied to the eroded binary map. The same mask as that used in the step 56 is used: for each pixel of the binary map eroded that has a positive value, the four immediately neighboring pixels are modified so as to take the unit value, regardless of their initial value.

By way of a variant, other kinds of masks different from the cross type mask illustrated in FIG. 4 may be used, such as square, circle, etc. It would be chosen based on the type of zone of the intermediate binary map on which it is applied. The size m of the mask is also an adjustable parameter for increasing or decreasing its radius of influence.

For the detection of very small sized objects in motion, the erosion will have a significant impact on the minimal size (in number of pixels) from which the detection of a target will be possible. Care therefore needs to be taken in choosing a mask size that is smaller than the size in pixels of the objects in motion that one is trying to detect.

Figure 5:
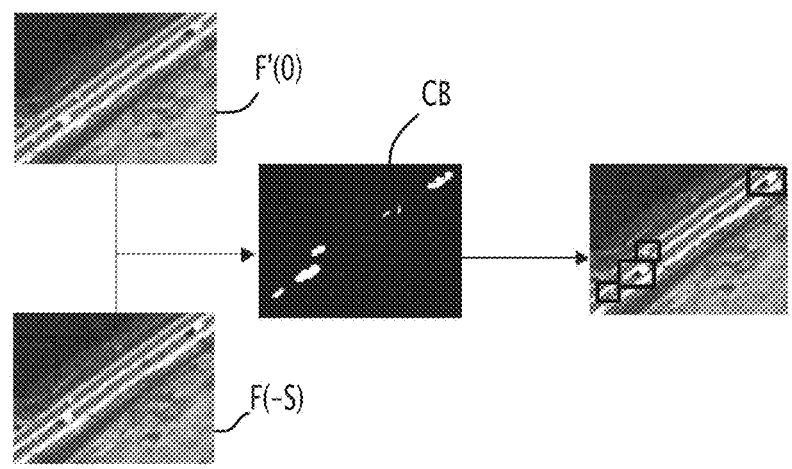
FIG. 5 represents different matrices of pixels at different stages of the method represented in FIG. 2.

Finally a binary map CB is obtained with the pixels in the motion, having a positive value. Such a binary map is represented in FIG. 5.

STEP 60 Determination of the Pixel Zones in Motion

In the step 60, a contour detection algorithm is applied to the bitmap in a manner so as to group together the pixels in motion corresponding to the same physical object in order to define the zones in motion within the binary map CB.

The result of this step is a raw list L of zones in motion defined by their contour, each contour itself being a list of 2D coordinates of pixels.

STEP 70 of Verification of Results

A verification step for verifying the result obtained in the step 60 is carried out in order to eliminate the false targets, or false alarms.

In order to do this, a calculation is performed to compute the correlation between the initial and final frames F(−s) and F'(0), on each of the zones in motion determined at the end of the step 60.

This involves calculating an index of correlation between the intensity evolution curves of the pixels of each of the frames on the same zone in motion.

When the index of correlation is between −0.5 and 0.5, it is considered that there is no correlation between the frames over the zone in motion. It is actually a zone that does not evolve or change in the same way between the two frames, but that does not correspond to an object in motion. For example, it could be a tree moving slightly under the effect of the wind, or of the apparent movement of a prominent object relative to its background on the image. In this case, the considered zone in question is rejected from the list L of contours.

If the result is comprised between 0.5 and 1, it is considered that the zone is similar from one frame to another. The zone being considered is not actually in motion. It is thus rejected from the list L.

If the result is between −1 and 0.5, the intensity curves of the two frames have a different and opposite evolution, which confirms the movement of an object that is capable of modifying the properties of the zone considered from one frame to the other. The corresponding zone is retained as a zone in motion in the list L.

This step 70 makes it possible to eliminate false alarms from the raw list L and obtain a "cleaned" list L'.

STEP 80 of Display.

The zones in motion of the list L' are displayed by being superimposed on the current frame T(0) displayed on the screen of the computer 12. The zones in motion are for example identified by a polygon containing in full the corresponding zone in motion. This polygon enables the operator to focus their attention on the portion of the image that is delimited so as to identify a target.

A polygon at the current time instant $t_0$ is displayed not only on the current frame T(0) displayed on the screen of the operator, but also on the subsequent frames of the video stream displayed on the screen of the operator, and this occurs until a new frame of the video stream, T(+s) for example, becomes the object of a target detection process by the implementation of the present method.

The polygons calculated at the time instant $t_{+s}$ are thus then taken into account. In a known manner, by means of the implementation of matching algorithms, a polygon at the time instant $t_{+s}$ is displayed in replacement for a polygon at the time instant $t_0$, if they correspond, with a high degree of probability, to the same target; a polygon at the time instant $t_{+s}$ is displayed as a new polygon if it cannot be matched with a polygon at the time instant $t_0$ and if it corresponds, with a high degree of probability, to a new target detected in the field of the camera a polygon at the time instant $t_0$ continues to be displayed if it cannot be matched with a polygon at the time instant $t_{+s}$ and it corresponds with a high degree of probability to a concealed target, that is to say which would be not detected in the frame T(+s).

Variants

The points selected in order to correct the parallax error or estimate the movement of the camera in relation to the ground must belong to the XY plane of the ground with a limited error. In practice, it often happens that the calculations carried out in the corresponding steps are altered or affected by outliers. In order to limit this effect, RANSAC (Random Sample Consensus) method provides the ability to ensure elimination of these outliers in an iterative manner, until a model that is suitable for the entire data set is found.

The processing of the frames for being placed in a static acquisition includes two major steps, the correction of the relative parallax error and the estimation of the movement of the camera in relation to the ground. By way of a variant, these two steps are carried out in a single operation, the evolution of the optical flow for the points of the ground providing information both pertaining to the speed of the camera in relation to the ground and the relative parallax error between the frames.

Advantages

The method according to the invention makes it possible to detect targets of small sizes (at least 3×3 pixels) and in a reactive manner (close to 40 ms between the appearance of the object on the frames and the detection thereof).

Advantageously, the method makes it possible to detect targets in a non-geo-referenced video stream. In addition, the information pertaining to the position of the carrier, for example determined by means of a system of location by satellite of the GPS (Global Positioning System) type, are not used.

The invention claimed is:

1. A method for detecting targets on the ground and in motion, within a video stream that is acquired by an airborne digital camera, comprising:
   processing a plurality of successive frames of the video stream to stabilize the plurality of successive frames as if they had been acquired by a fixed camera, comprising:
   correcting a relative parallax error affecting each frame of the plurality of successive frames to obtain, for each frame, a corrected frame, by implementing an algorithm for determining a projective mapping that passes from a frame at a current time to a corrected frame associated with a frame at a preceding time; and
   determining a motion vector of the airborne digital camera relative to the ground by implementing an algorithm for determining an optical flow that passes from the corrected frame at the current time to the corrected frame at the preceding time that is separated from the current time by a non-zero positive integer number of sampling time intervals; and
   comparing two processed frames, temporally separated one from the other, to identify a pixel zone in motion from one processed frame to the other, the pixel zone in motion constituting a detected target, comprising:
   subtracting pixel by pixel an initial frame from a final frame to obtain, for each pixel, a color distance value; and
   applying a color distance threshold, wherein each pixel whose color distance value is less than or equal to the color distance threshold, taking a null value, and each pixel whose color distance value is greater than the color distance threshold taking a unit value to obtain an intermediate binary map; and
   applying a contour determination algorithm on the intermediate binary map in order to group together pixels having a unit value into the pixel zone in motion.

2. The method according to claim 1, wherein the algorithm for determining the optical flow uses a homogenous grid of points.

3. The method according to claim 1, wherein the integer number is selected to be between 5 and 15.

4. The method according to claim 1, wherein, once the motion vector of the airborne digital camera relative to the ground has been determined, a corresponding transformation is applied to the corrected frame at the current time in order to compensate for an effect of a movement of the airborne digital camera relative to the ground and obtain the final frame that is superimposed on the corrected frame at the preceding time, considered as being the initial frame.

5. The method according to claim 4, further comprising obtaining a binary map from the intermediate binary map, comprising:
   applying a morphological erosion mapping to the intermediate binary map, using an appropriate mask, to obtain an eroded binary map; and
   applying a morphological dilatation mapping to the eroded binary map, using the appropriate mask of the morphological erosion mapping, to obtain the binary map.

6. The method according to claim 4, further comprising verifying a consistency of the pixel zone in motion identified at the end of said comparing two processed frames, comprising determining a correlation index between pixel values of the two processed frames, the pixel zone in motion being deemed to correspond to a target when the correlation index is between −1 and −0.5.

7. The method according to claim 1, wherein the pixel zone in motion identified is displayed over the video stream displayed on a control monitor.

8. The method according to claim 1, wherein the video stream is a video stream in a visible spectral domain or an infra-red domain.

9. The method according to claim 1, executed in real time or in constrained time on the video stream.

10. A non-transitory data recording medium for recording information that contains computer program instructions suitable for being executed by a computer in order to implement the method according to claim 1.

* * * * *